(12) United States Patent
Kirchner et al.

(10) Patent No.: US 7,084,611 B2
(45) Date of Patent: Aug. 1, 2006

(54) DC/DC CONVERTER

(75) Inventors: Joerg Kirchner, Mauern (DE); Thomas Keller, Freising (DE); Christian Schimpfle, Wartenberg (DE)

(73) Assignee: Texas Instruments Incorporated, Dallas, TX (US)

( * ) Notice: Subject to any disclaimer, the term of this patent is extended or adjusted under 35 U.S.C. 154(b) by 80 days.

(21) Appl. No.: 10/692,448

(22) Filed: Oct. 23, 2003

(65) Prior Publication Data

US 2004/0135556 A1  Jul. 15, 2004

(30) Foreign Application Priority Data

Oct. 24, 2002  (DE)  ............................. 102 49 802

(51) Int. Cl.
*G05F 1/613*  (2006.01)

(52) U.S. Cl. .................................... 323/222; 323/224

(58) Field of Classification Search ................ 323/222, 323/224, 225
See application file for complete search history.

(56) References Cited

U.S. PATENT DOCUMENTS

| 5,929,615 | A | | 7/1999 | D'Angelo et al. |
| 5,994,882 | A | * | 11/1999 | Ma .............................. 323/222 |
| 6,091,232 | A | * | 7/2000 | Criscione et al. ........... 323/222 |
| 6,310,466 | B1 | * | 10/2001 | Criscione .................... 323/222 |

FOREIGN PATENT DOCUMENTS

| EP | 1 067 662 A1 | 1/2001 |
| WO | WO 99/61965 | 12/1999 |

* cited by examiner

*Primary Examiner*—Jeffrey Sterrett
(74) *Attorney, Agent, or Firm*—Alan K. Stewart; W. James Brady, III; Frederick J. Telecky, Jr.

(57) ABSTRACT

The invention relates to a DC/DC converter including an input to which an input voltage Vin is applied, a inductance L whose one terminal is connected to the input, a first controllable switch N1 via which the other terminal of the inductance is connectable to a reference potential Vss, a second controllable switch P1 via which the other terminal of the inductance is connectable to the output of the converter, and a regulator circuit 1 configured so that it is able to control the two switches in regulating the output voltage of the DC/DC converter to a predetermined wanted value. The second controllable switch is a PMOS-FET. The regulator circuit is configured so that when the input voltage is higher than the desired value of the output voltage, the gate of the PMOS-FET is permanently connected to a voltage which is larger than the difference between the input voltage and the threshold voltage of the PMOS-FET, it connecting the back gate of the PMOS-FET permanently to a voltage which is larger than the expression input voltage plus threshold voltage of the PMOS-FET minus the diode voltage of a pn junction of the PMOS-FET and timing the first controllable switch with a specific duty cycle so that the output voltage attains the wanted value. The converter in accordance with the invention now permits achieving both an increase and decrease in the input voltage. It can be put to use preferably in conjunction with battery-powered devices for which a wanted voltage is specified.

11 Claims, 1 Drawing Sheet

DC/DC CONVERTER

RELATED APPLICATION

The present application is based on priority of German Patent Application No. 102 49 802.4, filed on Oct. 24, 2002.

FIELD OF THE INVENTION

The present invention relates to a DC/DC converter as well as to a method for DC voltage conversion.

BACKGROUND OF THE INVENTION

Belonging to the simplest prior art DC/DC converters are the so-called inductor-type converters serving to achieve a practically lossless potential conversion of a DC voltage into a desired output DC voltage with the aid of an inductance. One of the basic types of the inductor-type converters is the so-called step-up converter with which an input DC voltage can be converted into a boosted output DC voltage whose value exceeds that of the input DC voltage.

One such step-up converter is described e.g. in the German book on switching power supplies "Schaltnetzteile" by Udo Leonhard Thiel, 2nd Edition, published 1998 by Franzis-Verlag, on pages 34 et seq. In this described step-up converter, an input voltage is applied to the one terminal of an inductance, the other terminal of which can be connected via a controllable switch alternatingly to ground or a capacitor provided at the output of the circuit and the consumer respectively. In this arrangement, it is the duty cycle of the switch that determines the value of the output voltage. Inserted between the other terminal of the inductance and the capacitor is a diode preventing the backflow of current from the output of the regulator to the input. To devise the circuit, the current-saving diode is replaced as a rule by two controllable switches for the first of which a MOS-FET is used and for the second switch a PMOS-FET.

One such circuit in which two MOS-FETs are used as the controllable switches is illustrated in FIG. 1 wherein the NMOS-FET is identified by N1 and the PMOS-FET by P1. The inductance L is connected by its one terminal to the input voltage Vin of the DC/DC converter and by its other terminal to the drain of the NMOS-FET whose source is connected to ground potential Vss. The other terminal of the inductance L is additionally connected to the drain of the PMOSFET P1 whose source is connected to the output of the circuit. The back gate of the PMOS-FET is connected to the output voltage Vout. Provided further is a regulation circuit 1 which monitors the output voltage Vout and alternatingly connects the switches N1 and P1, the duty cycle being set so that the wanted value of the output voltage is attained. In this arrangement, the output voltage Vout and ground potential is alternatingly applied to the terminals of the two MOS-FETs.

Provided further at the output of the circuit is a storage capacitor C.

One problem associated with the simple circuit as shown in FIG. 1 is that it can only be put to use for step-up but not for step-down voltage regulation. When in the circuit as shown in FIG. 1, the value of the input voltage Vin exceeds the wanted value of the output voltage by a transistor threshold voltage, a current flows via the back gate of the PMOS-FET P1 which charges the output capacitor C to a value higher than the wanted value of the output voltage thus making stepdown regulation impossible. The circuit as shown in FIG. 1 is thus not suitable e.g. for battery-powered devices in which the battery voltage during the lifetime of the battery initially exceeds the wanted operating voltage of a device powered with a voltage regulator so that it needs to be bucked (stepped down), and later after a certain discharge of the battery, drops below this wanted voltage so that it needs to be boosted (stepped up). For such applications, only relatively complicated converters such as buck+boost or SEPIC converters come into question necessitating a costly array of external components.

SUMMARY OF THE INVENTION

The invention is thus based on the objective of providing a particularly simple DC/DC converter necessitating just a few components while achieving both step-up and step-down regulation. In addition, the invention is based on the objective of providing a particularly simple method for DC voltage conversion by means of a DC/DC converter.

This objective is achieved by a DC/DC converter comprising an input to which an input voltage is applied, a inductance whose one terminal is connected to the input, a first controllable switch via which the other terminal of the inductance is connectable to a reference potential, a second controllable switch via which the other terminal of the inductance is connectable to the output of the converter, and a regulator circuit configured so that it is able to control the two switches in regulating the output voltage of the DC/DC converter to a predetermined desired value, the second controllable switch being a PMOS-FET and the regulator circuit being configured so that when the input voltage is higher than the desired value of the output voltage, the gate of the PMOS-FET is permanently connected to a voltage which is larger than the difference between the input voltage and the threshold voltage of the PMOS-FET, connecting the back gate of the PMOS-FET permanently to a voltage which is larger than the expression input voltage plus threshold voltage of the PMOS-FET minus the diode voltage of a pn junction of the PMOS-FET and timing the first controllable switch with a specific duty cycle so that the output voltage attains the wanted value.

Further, this objective is achieved by a method for DC voltage conversion by means of a DC/DC converter having an input to which an input voltage is applied, a inductance whose one terminal is connected to the input, a first controllable switch via which the other terminal of the inductance is connectable to a reference potential, a second controllable switch in the form of a PMOS-FET via the source-drain circuit of which the other terminal of the inductance is connectable to the output of the converter, wherein when the input voltage of the DC/DC converter exceeds the desired value of the output voltage, the gate of the PMOS-FET is permanently connected to a voltage which is larger than the difference between the input voltage and the threshold voltage of the PMOS-FET, the back gate of the PMOS-FET is permanently connected to a voltage which is larger than the expression input voltage plus threshold voltage of the PMOS-FET minus the diode voltage of a pn junction of the PMOS-FET and the first controllable switch is timed with a specific duty cycle so that the output voltage attains the desired value.

DETAILED DESCRIPTION OF THE INVENTION

Figure 1:
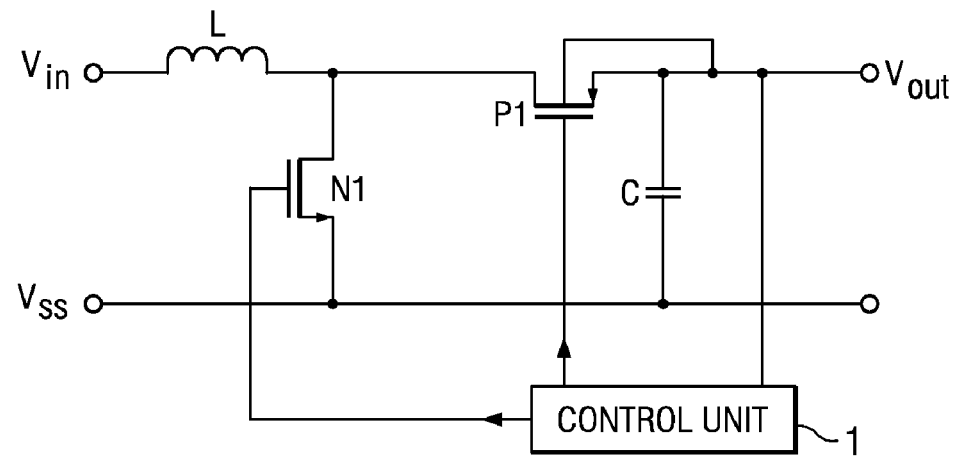
FIG. 1 is a circuit diagram of DC/DC converter.

FIG. 1 illustrates a DC/DC converter circuit as described at the outset, serving to explain the gist of the invention.

Figure 2:
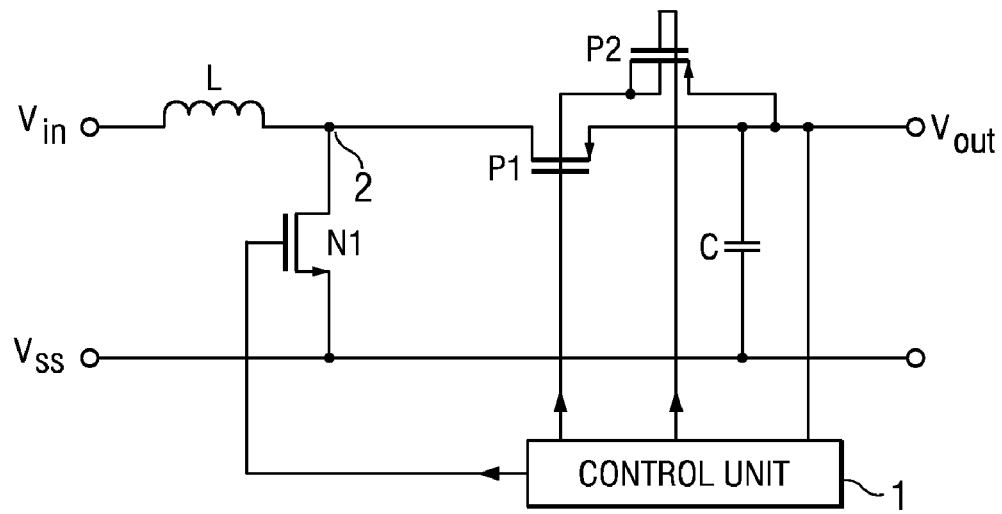
FIG. 2 is circuit diagram of a preferred embodiment of a DC/DC converter in accordance with the invention.

FIG. 2 illustrates a preferred embodiment of a DC/DC converter in accordance with the invention in the form of its circuit diagram.

The circuit as shown in FIG. 2 has a similar configuration to that as shown in FIG. 1. The configuration of the circuit as shown in FIG. 2 will first be described.

Referring now to FIG. 2, there is illustrated how the circuit includes an inductance L also termed choke. Applied to the one terminal of the inductance is the input voltage Vin of the DC/DC converter which may be furnished e.g. by a battery. The other terminal of the inductance L is connected to the drain of a NMOS-FET N1 whose source is connected to the reference potential which in the present example includes the ground potential Vss. Instead of the first NMOSFET N1, some other controllable switch, e.g. a bipolar transistor may also be used.

The other terminal of the inductance L is connected in addition to the drain of a first PMOS-FET P1 whose source is connected to the output of the DC/DC converter at which the output voltage Vout is available.

The back gate of the first PMOS-FET P1 is connected differently to that as shown in FIG. 1 the back gate of P1 is not connected to the output voltage Vout, but to the drain of a second PMOS-FET P2 whose source is connected to the output of the converter, at which the output voltage Vout is available. The back gate of the second PMOS-FET P2 is connected to the back gate of the first PMOS-FET P1.

In the preferred embodiment of the DC/DC converter as described, all MOS-FETs are AUTO OFF.

The output of the circuit is applied to the storage capacitor C.

The circuit includes in addition a regulator circuit 1 including an oscillator (not shown). The regulator circuit is connected to the gates of the three MOS-FETs N1, P1 and P2 for their control. The regulator circuit includes in addition a first comparator circuit (not shown) to determine whether the output voltage Vout has dropped below a predetermined desired value. The first comparator circuit may consist of e.g. a comparator to the one input of which a reference voltage is applied, defining the desired value of the output voltage, and to the other input of which a voltage derived from the actual output voltage is applied as may be derived e.g. via an ohmic voltage divider from the output voltage by known ways and means. The regulator circuit includes further a second comparator circuit for determining whether the input voltage Vin of the converter is higher or lower than the desired value of the output voltage. The second comparator circuit too, may includes a comparator whose inputs are connected to the input voltage Vin and output voltage Vout respectively.

Referring still to FIG. 2, there is illustrated a circuit diagram for explaining the functioning of the circuit when the input voltage Vin of the circuit is furnished by a battery.

It is assumed that the battery is initially fully charged and the voltage Vin furnished by the battery is higher than the wanted output voltage Voutw to be furnished by the DC/DC converter for an electronic device connected to its output. The second comparator circuit in the regulator circuit "sees" this condition and outputs a corresponding signal to "buck" the DC/DC converter into the so-called down mode in outputting a voltage which is lower than the input voltage Vin.

This is achieved by the regulator circuit permanently applying the input voltage Vin to the gate of the first PMOS-FET P1 and to the gate of the second PMOS-FET P2. This now prevents, unlike the circuit as shown in FIG. 1, a flow of current via the back gate of the first PMOS-FET P1 to the output of the converter, i.e. the first PMOS-FET P1 is not activated in the down mode. The voltage appearing at the node 2 fluctuates between zero and Vin plus a threshold voltage VTPMOS of the PMOS-FET in thus making it possible in the down mode to achieve a desired output voltage which is lower than the input voltage Vin of the converter. The NMOS-FET N1 in the down mode is turned on/off with a certain duty cycle to achieve a wanted voltage at the output of the converter which is lower than the input voltage Vin. In this arrangement, the gate of the NMOS-FET N1 is alternatingly connected by the regulator circuit 1 to the output voltage Vout (N1 ON) and ground Vss (N1 OFF). The duty cycle D, i.e. the ratio of the ON time ton of N1 to the period T is given by the formula: $D=t_{on}/T=V_{TPMOS}/(V_{in}+V_{TPMOS})$ assuming no ohmic losses by the switches N1 and P1. In this arrangement, the duty cycle is corrected with the aid of the first comparator means so that a desired output voltage Vout is achieved. When the NMOS-FET N1 is turned on in the down mode, a current is formed through the inductance L. When NMOS-FET N1 is returned OFF, the node 2 is pulled by a threshold voltage of the PMOS-FET P1 above the input voltage until a current begins to flow to the output of the converter. It is this generated drop in voltage that make it possible to reduce the current through the inductance when the NMOS-FET is turned off, in thus resulting in the output voltage Vout of the converter not being forced to assume the value of the input voltage Vin, it instead being able to assume values which are lower than the value of the input voltage Vin.

Because of the drop in voltage across the PMOS-FET the effectiveness in the down mode is approx. 10 to 20 percent less than in the normal "boost" mode as described below. However, for battery-powered applications in which the battery voltage is higher than the desired voltage value, e.g. only during a minor percentage of the total battery life, the converter as described represents a simple and cost-effective solution.

For the DC/DC converter in accordance with the invention to function, the gate voltage of the first PMOS-FET P1 must not necessarily correspond to the input voltage Vin, this merely requiring a voltage to be applied which is larger than the difference between the input voltage Vin and the threshold voltage VTPMOS of the PMOS-FET.

Decoupling the back gate of the first PMOS-FET P1 may also be engineered otherwise as shown in FIG. 2 and as described above, this merely requiring a voltage to be permanently applied to the back gate of the first PMOS-FET P1 in the down mode which is larger that the expression input voltage plus threshold voltage of the PMOS-FET minus diode voltage of a pn junction of the PMOSFET.

A gradual reduction in the battery voltage applied to the input of the DC/DC converter during the lifetime of the battery until it drops below the wanted output voltage of the DC/DC converter now results in the second comparator circuit outputting a signal in the regulator circuit by means of which the converter is switched into a second operating mode, the so-called boost mode. In this mode, a voltage is achieved at the output of the DC/DC converter which is higher than the input voltage Vin. In the boost mode, the gate of the second PMOS-FET P2 is then permanently connected to the reference potential, i.e. ground Vss by the regulator circuit 1. In addition, NMOS-FET N1 as well as the first PMOS-FET P1 are alternatingly turned on and off with a specific duty cycle selected so that the wanted value of the output voltage is achieved at the output of the converter. In this arrangement, when the NMOS-FET N1 is required ON and the first PMOSFET P1 is required OFF, resulting in energy being stored in the inductance L, the regulator circuit 1 ensures that the output voltage Vout is applied to the gates of the NMOS-FET N1 and of the first PMOS-FET P1 and then when the NMOS-FET N1 is required OFF and the first PMOS-FET P1 is required ON, resulting in energy being output from the inductance L to the output of the converter, the regulator circuit 1 ensures that the gates of the NMOS-FET N1 and of the first PMOS-FET P1 are grounded with Vss. Operation of the DC/DC converter as a step-up (boost) converter is not detailed herein.

The invention claimed is:

1. A DC/DC converter comprising:
    an input to which an input voltage (Vin) is applied,
    an inductance (L) whose one terminal is connected to said input,
    a first controllable switch (N1) via which the other terminal of said inductance (L) is connectable to a reference potential (Vss),
    a second controllable switch (P1) via which the other terminal of said inductance (L) is connectable to the output of said converter, and
    a regulator circuit (1) configured so that it is able to control said two switches (N1, P1) in regulating the output voltage (Vout) of said DC/DC converter to a predetermined wanted value, said second controllable switch being a PMOS-FET and said regulator circuit (1) being configured so that when said input voltage (Vin) is higher than said wanted value of said output voltage, a gate of said PMOS-FET (P1) is permanently connected to a voltage which is larger than the difference between said input voltage and the threshold voltage of said PMOS-FET, connecting a back gate of said PMOS-FET permanently to a voltage which is larger than the expression input voltage plus threshold voltage of said PMOS-FET minus diode voltage of a pn junction of said PMOS-FET and timing said first controllable switch (N1) with a specific duty cycle so that said output voltage attains said wanted value.

2. The DC/DC converter as set forth in claim 1, wherein said first controllable switch is a NMOS-FET.

3. The DC/DC converter as set forth in claim 2, wherein both MOS-FETs are AUTO OFF.

4. The DC/DC converter as set forth in claim 2, wherein said regulator circuit is additionally configured so that when said input voltage is lower than the wanted value of said output voltage, the gates of said NMOS-FET and PMOS-FET can be alternatingly timed to connect the output voltage of said DC/DC converter and said reference potential with a specific duty cycle so that the output voltage of said DC/DC converter attains said wanted value.

5. The DC/DC converter as set forth in claim 1, wherein said regulator circuit is configured so that when said input voltage is higher than said wanted value of said output voltage, the gate of said PMOS-FET is permanently connected to said input voltage.

6. The DC/DC converter as set forth in claim 1, wherein the back gate of said PMOS-FET is connected to the drain of a further PMOSFET, the source of said further PMOS-FET being connected to the output of said DC/DC converter and the back gate of said further PMOS-FET to its drain and said regulator circuit being configured so that when said input voltage is higher than the wanted value of said output voltage, the gate of said further PMOS-FET is permanently connected to said input voltage.

7. The DC/DC converter as set forth in claim 1, wherein in addition a storage capacitor is provided between the output of said DC/DC converter and reference potential.

8. The DC/DC converter as set forth in claim 1, wherein said reference potential is ground.

9. A method for DC voltage conversion by a DC/DC converter comprising:
    an input to which an input voltage is applied,
    a inductance whose one terminal is connected to said input,
    a first controllable switch via which the other terminal of said inductance is connectable to a reference potential, and
    a second controllable switch in the form of a PMOS-FET via the source-drain circuit of which the other terminal of said inductance is connectable to the output of said converter,
    wherein when said input voltage of said DC/DC converter exceeds the wanted value of said output voltage, the gate of said PMOS-FET is permanently connected to a voltage which is larger than the difference between said input voltage and said threshold voltage of said PMOS-FET, the back gate of said PMOS-FET is permanently connected to a voltage which is larger than the expression input voltage plus threshold voltage of said PMOS-FET minus diode voltage of a pn junction of said PMOS-FET and said first controllable switch is timed with a specific duty cycle so that said output voltage attains said wanted value.

10. The method as set forth in claim 9 wherein said first controllable switch is a NMOS-FET.

11. The method as set forth in claim 10 wherein when said input voltage is lower than a predetermined wanted value for said output voltage of said DC/DC converter, said two controllable switches are timed with a specific duty cycle opposingly so that said output voltage attains said wanted value, said output voltage of said DC/DC converter and said reference potential being applied alternatingly to the gates of said PMOS-FET and of said NMOS-FET.

\* \* \* \* \*